(No Model.) 2 Sheets—Sheet 1.
W. & J. ALLINGHAM.
STALK CUTTING MACHINE.
No. 508,906. Patented Nov. 21, 1893.
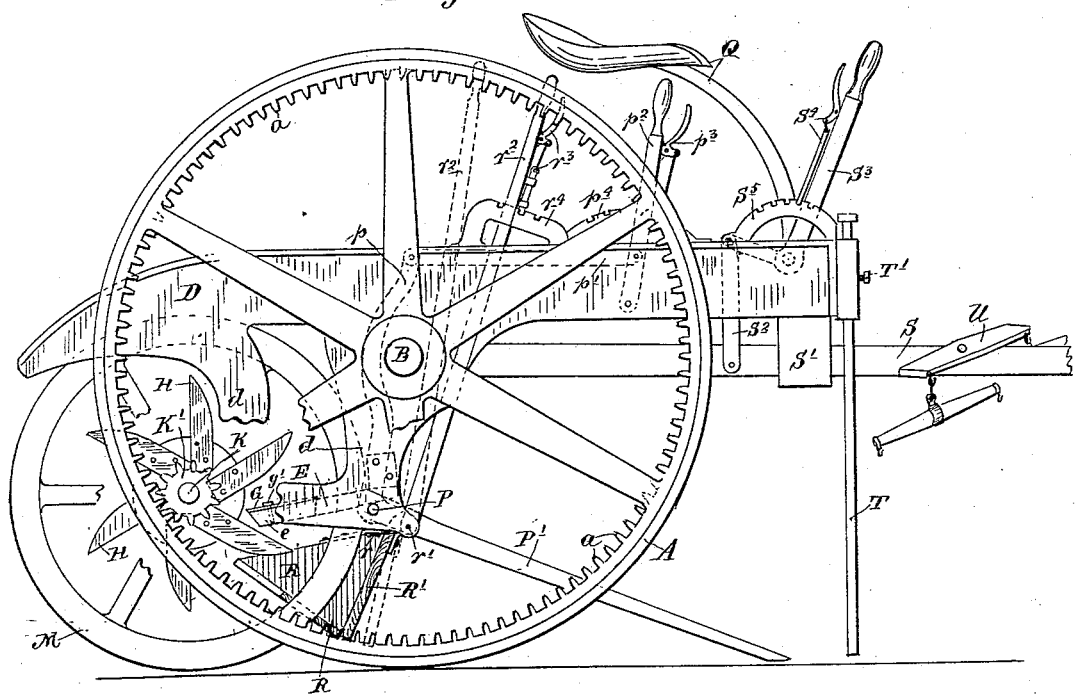

(No Model.) 2 Sheets—Sheet 2.
W. & J. ALLINGHAM.
STALK CUTTING MACHINE.
No. 508,906. Patented Nov. 21, 1893.
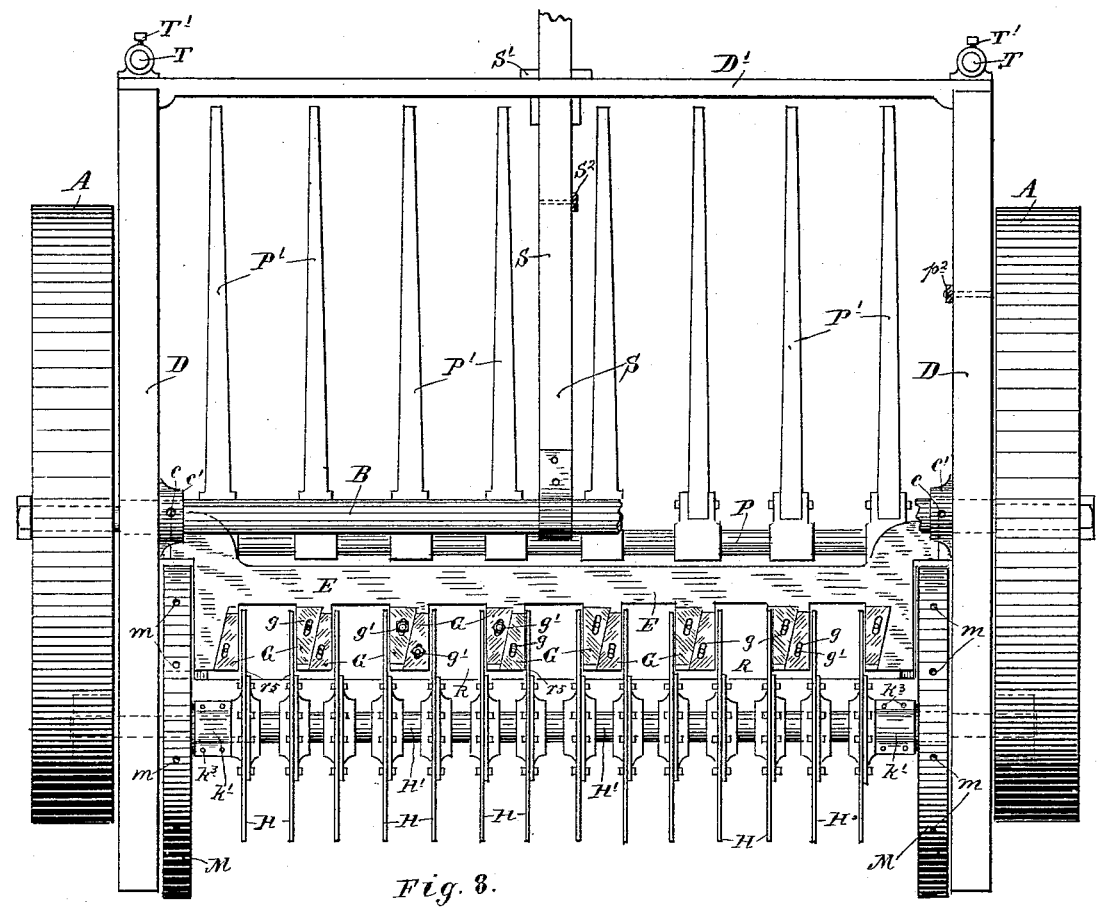
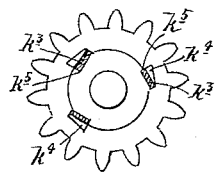
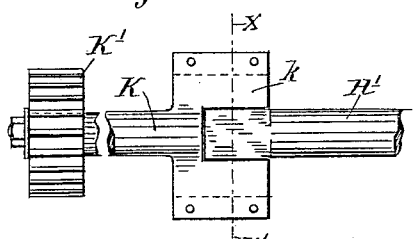
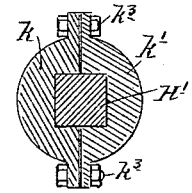
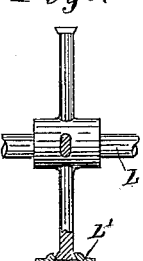
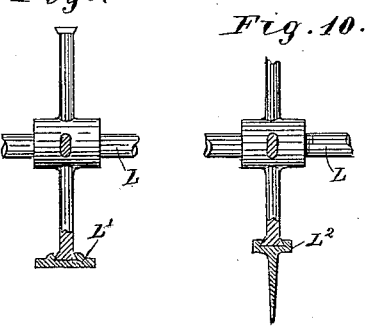
Witnesses.
A. H. Opsahl.
Frank D. Merchant.
Inventors
William Allingham
James Allingham
By their Attorney.
Jas. P. Williamson

UNITED STATES PATENT OFFICE.

WILLIAM ALLINGHAM, OF EL CAJON, CALIFORNIA, AND JAMES ALLINGHAM, OF MINNEAPOLIS, MINNESOTA.

STALK-CUTTING MACHINE.

SPECIFICATION forming part of Letters Patent No. 508,906, dated November 21, 1893.

Application filed May 4, 1892. Serial No. 431,860. (No model.)

*To all whom it may concern:*

Be it known that we, WILLIAM ALLINGHAM, residing at El Cajon, in the county of San Diego and State of California, and JAMES ALLINGHAM, residing at Minneapolis, in the county of Hennepin and State of Minnesota, citizens of the United States, have invented a new and useful Improvement in Vine, Stalk, and Brush Cutting Machines, a modification of which may be adapted for the purpose of destroying weeds and harrowing and rolling the ground, of which the following is a specification, reference being had therein to the accompanying drawings.

Our invention has for its object to provide an efficient machine for cutting up brush, vines, stalks, weeds, and trash of all kinds, which may lie loose upon the ground. The machine is also provided with interchangeable tools, by the application of which the machine may be used for cultivating the ground.

The machine was especially designed for use in the large vineyards on the Pacific coast, where the removal of the trimmings cut from the vines involves a large amount of labor. The machine is equally applicable for cutting up the trimmings from fruit or shade trees, the loose brush in clearings, stalks in corn fields, loose weeds, or other forms of trash. Such materials, when thus cut into small bits, may either be used for fuel, or be turned under and made to serve as a fertilizer. This machine is so constructed as to adapt the same for disposing of the cut up materials in either way.

The invention consists of certain novel devices and combinations of devices, which will be hereinafter fully described and be defined in the claims.

A machine embodying the invention is illustrated in the accompanying drawings, wherein like letters refer to like parts throughout the several views.

Figure 1 is a right side elevation of the machine, some parts being broken away. Fig. 2 is a plan view of the same, some parts being broken away, and others removed. Fig. 3 is a detail, in plan, showing the relations of the cutter bar, to the main frame and the balance wheels of the rotary cutter shaft. Fig. 4 is a detail, in rear elevation, showing the cutter-bar detached. Fig. 5 is a detail, in plan, with some parts broken away, showing the way in which the hopper-shaped receiver is supported from the main frame. Fig. 6 is a detail, in plan, with some parts removed and others broken away, showing one of the stub shafts with coupling heads. Fig. 7 is a cross section on the line X X' of Fig. 6, with the cap section of the coupling head in position. Fig. 8 is a detail in end elevation, showing the clutch connection between one of the stub shafts and the pinion carried thereby. Fig. 9 is a detail in rear elevation or plan, showing a substitute tool shaft, carrying cultivating hoes or shovels. Fig. 10 is a similar view of the same with harrow teeth. Fig. 11 is a view in plan, illustrating the application of lagging to the balance wheels of the stub shafts for converting the machine into a roller.

A A are a pair of drivers or ground-wheels, provided with internal gears $a$ $a$. These drivers are loosely mounted on the spindle ends of a common axle B, which extends through the side castings D which constitute the main parts of the machine frame. The axle is secured to these castings against endwise or rotary movement, the means shown for the purpose being pins $c$, extending through the axle and bosses $c'$, on the inner surfaces of the casting D. The castings D are braced at their forward ends by a cross tie D'. These castings D, when in position on the axle and connected by the cross-tie D', will constitute a sufficiently rigid frame, for many uses of the machine.

When the machine is applied for cutting brush and vines, it is necessary that the frame should be very strong and rigid. To secure this result and provide suitable supports or bearings for some of the other parts, the frame castings D, have downwardly extended bracket-like portions $d$. To the lower ends of these depending brackets or flanges $d$, is removably secured a strong and rigid cutter bar E, which in addition to its function as a cutter-bar, serves to brace the main frame at those points and render the same extremely rigid and strong.

The cutter-bar is provided with projecting guards or bearing surfaces $e$, to which are adjustably secured pairs of shearing plates G.

These shearing plates are reversely inclined on their adjacent surfaces, and are adjustably and removably secured to the guards, as shown, by means of slots $g$ and machine screws $g'$. These shearing plates co-operate with a series of rotary cutters H, which are carried on a common rotary shaft H'. These cutters may be of any suitable construction and be secured to the shaft in any suitable way. As shown, the cutters are in the form of radial knives removably secured to disks or collars fixed to the shaft. The cutter carrying shaft H' is removably connected, at its opposite ends, through a suitable coupling device with a pair of stub shafts K, which are journaled in the bracket portions $d$ of the frame castings D, and carry at their outer ends pinions K', in mesh with the internal gears $a$, on the drivers or ground wheels A. The coupling device, as shown consists simply of an enlarged and divided head $k\ k'$, of which parts, the section $k$ is formed integral with the inner end of the stub shaft and the other section $k'$ is removably secured to the fixed section, in any suitable way, as by bolts and nuts $k^2$. The end of the shaft is made angular in cross section and the two parts of the coupling head are recessed or cut away to form a seat of corresponding shape, for receiving and turning the shaft. This form of coupling device, permits the cutter carrying shaft H' to be removed, whenever so desired; and any other tool carrying shaft, such as the shaft L, with cultivating shovels L' or harrow-teeth $L^2$, as shown in Figs. 9 and 10, to be substituted in place of the shaft H', certain other parts of the machine being correspondingly changed as required.

The pinions K' are connected to the stub shafts through a species of clutch mechanism, which permits the shafts to turn independently of the pinion, if necessary. The construction shown for this purpose, consists of loose pieces $k^3$, resting in notches $k^4$ cut on the interior of the pinion and engaging with shoulders $k^5$, on the exterior of the shaft. The arrangement of these parts is such, that the shaft may turn in the pinion; or if the shaft be held stationary, the pinion may turn on the shaft; while in the forward motion of the machine, the pinions will be made to drive the two stub shafts K and the tool carrying shart H'. This, or some equivalent clutch mechanism, for connecting the stub shafts and pinions, is desirable, in order to adapt the machine for turning around, without sliding one of the ground wheels.

The stub-shafts K are provided with balance wheels M, rigidly secured thereto, as shown, adjacent to their coupling heads. The relative sizes of the internal gears $a$, on the driving wheels A and the pinions K' on the stub-shafts, are such, that the said stub-shafts and the tool carrying shaft H', connected thereto, will be driven at a high rate of speed; which high speed is necessary for the efficient action of the cutting devices. The balance wheels M serve to steady the motion of the cutter-shaft and cutters, and to remove or materially reduce the sudden jars and strains, which would otherwise be produced on the draft animals, by the entrance of large or comparatively rigid pieces of brush or vines between the shearing plates and the cutters. These balance wheels M, when the machine is used for cutting purposes, clear the ground. The frame may, however, be adjusted to drop the same onto the ground, and the said balance wheels are provided with screw-seats $m$ on their peripheries, adapting the same for the application of roller lagging $M^2$, as shown in Fig. 11, for converting the machine into a roller. When this lagging is applied, the pinion K' must of course, be removed from the stub shafts K. The cutter bar E is also either removed or adjusted into a different position, so as to afford the necessary clearance for the action of the roller. The roller lagging $M^2$ is constructed into two or more sections, so as to permit its application to the said balance wheel.

Directly in front of the cutter bar, is located an idle shaft P, journaled in the bracket portions $d$ of the frame castings D; to which shaft are secured a series of gathering fingers P', which extend forward and downward on an incline and terminate at a point near the ground. The idle shaft P is provided with lever connections $p\ p'\ p^2$, extending to within reach of the driver, the hand-lever of which is provided with a latch $p^3$, engageable with the notch segment $p^4$, fixed to one of the frame castings; by which connections, the driver may rock the shaft P, and set the gathering fingers P', at any desired angle, with respect to the cutter-bar so as to bring the tips of the fingers near to the ground, or at any desired point above the same.

Q represents the driver's seat.

Directly under the cutter-bar, in position to catch the cut up material, as it drops from the cutting devices, is located a hopper-shaped receiver R R'. Of the said parts, R is secured by angle iron brackets $r$ to the depending parts $d$ of the frame casting D, and is thereby held rigid with the frame. The other part R', which is the front wall of the hopper, is pivoted to the frame bracket $d$, as shown at $r'$, and is provided with a hand-lever $r^2$, extending to within reach of the driver, and provided with a latch $r^3$, engageable with a notch-segment $r^4$, fixed to one of the frame castings. By means of this lever $r^2$ the section R' or front wall of the hopper may be swung on its pivot into the dotted line position, shown in Fig. 1, thereby permitting the materials to drop out of the hopper onto the ground. Normally, the section R' is in its closed position, where it is locked by the latch on the hand-lever $r^2$. The rear wall R of the hopper, is notched, as shown at $r^5$, to permit the passage of the radial knives on the rotary cutters H.

S is the tongue or pole piece, which is loosely boxed on the main axle B, and works through a stirrup S', at the forward end of the frame. The stirrup, as shown, is secured to the cross tie D'. A link S² connects the pole with the short arm of a bell-crank hand lever S³ within reach of the driver, which is provided with a latch S⁴, engageable with notch segment S⁵, fixed to a part of the frame. By this hand-lever S³ and its connections to the tongue S, the frame of the machine may be tilted on the axle B, so as to adjust the working parts of the machine into their proper operative positions, with respect to the ground. For example, in the position of the frame, as shown, the balance wheels M will stand clear of the ground; but, by simply lowering the tongue, or raising the front end of the frame, by the hand-lever S³, the said wheels M may be thrown downward, so as to run on the ground, as is required when the roller is employed.

T are dividers adjustably secured to the forward corners of the machine by set-screws T'.

U represents a double-tree on the pole for the attachment of the draft animal.

The operation of the machine is obvious. Supposing the parts to be arranged, as shown in the principal views, for the application of the machine as a cutter, then under the forward movement of the machine, the vines, brush, or other material will be gathered by the fingers P' and passed upward to the cutter-bar. The cutter-shaft and cutters moving, as they do, at a high rate of speed, will then engage the vines or brush, and in co-operation with the shearing plates G, on the cutter-bar, cut the same up into small bits and deliver the cut up materials into the receiver R R'. Whenever the receiver is full, the operator, through the hand-lever r² and its connections, can swing the front wall R' forward on its pivots, thereby allowing the materials to drop out of the hopper on to the ground. The dividers T, under the forward motion of the machine, serve to effect a separation between the materials, which are to be gathered on to the machine, and the materials lying to either side of the machine's path. In virtue of the relative position of the elevated cutter-bar with shearing-plates, the forwardly and downwardly extended gathering fingers and the series of rotary cutters located directly to the rear of the cutter-bar, the vines, brush, or other materials are bound to be lifted up clear of the ground, so as to be disentangled from the other similar materials, at the sides of the machines, and will be cut up by the cutting devices, at a point where it is convenient to deliver the same into the receiver. In other words, with this particular relation of these parts, the cutter-bar serves practically, as an elevated platform, on which the materials are cut. The receiver R R' is used where it is desired to dump the cut up materials into wind-rows, for the purpose of convenience, in gathering and removing the same for use as fuel. If it should be desired to plow under the cut up materials, for use as a fertilizer, then the receiver R R' is removed; and the cut up materials are allowed to drop directly from the cutting devices on to the ground.

If it is desired to convert the machine from a cutter into a cultivator, the shaft H', together with its rotary cutters H, are removed from the stub-shafts K and other tool shafts L with the desired kind of cultivating tools, such as shovels L' or harrow-teeth L², substituted instead. If it is desired to convert the machine into a roller, the pinions K' are removed from the stub shafts K and the lagging M² is applied to the balance wheels M, by means of lagging screws m', engaging the screw-seats m. The frame is then adjusted on the axle, with reference to the tongue, by means of the hand lever S³, so as to throw the roller on to the ground. When the cultivating tools or the roller lagging are applied, the cutter-bar E, is either removed or adjusted into a different position, so as to give the necessary clearance for the operation of the said substituted parts. The cutter-bar may be thus readily adjusted out of the way of the cultivating tools, by removing one or more of the bolts, by which it is secured to the frame castings, and turning the same forward into or beyond the vertical position, when it may be again secured to the castings and continue to serve its functions as a cross brace to the frame. Or the cutter-bar may be entirely removed and a substitute brace be put in its place.

It should be noted, that the shearing plates G, on the cutter-bar, co-operate with the radial knives of the rotary cutters to operate on the material being cut with the shearing action; which renders the said cutting devices very effective. The fact that they are removable permits the same to be ground, whenever necessary, or a new plate to be substituted in case of breakage; and the fact that they are adjustable, on their seats or the guards e, permits the same to be properly set, for the proper co-operative action with the knives of the rotary cutters.

It will, of course be understood, that in case it is not desired to employ interchangeable tools, that the stub-shafts K, might be dispensed with and the tool shaft itself, be extended through the side castings of the frame, and be made to carry the pinions K'.

What we claim, and desire to secure by Letters Patent, is as follows:

1. In a machine of the class described, the combination with the elevated cutter-bar, of the gathering fingers projecting forward of the cutter-bar, the fixed knives secured to the rear of the cutter-bar, and the series of rotary cutters located to the rear of the cutter-bar, and cooperating with said fixed knives, substantially as described.

2. In a machine of the class described, the combination with the elevated cutter-bar, provided with the backwardly extending fixed knives, of an idle shaft in front of the cutter-bar, provided with a series of forwardly extended and downwardly inclined gathering fingers and with lever connections within reach of the driver, for rocking the shaft and setting the fingers at any desired angle, and the series of rotary cutters, located to the rear of the cutter-bar and cooperating with said fixed knives, substantially as described.

3. In a machine of the class described, the combination with the elevated cutting devices and the gathering devices, substantially as described, of a hopper-shaped receiver, located directly below the cutting devices, to catch the cut up materials, and provided with a pivoted wall having lever connections extending to within reach of the driver, for dumping out the materials, at will, substantially as described.

4. In a machine of the class described, the combination with a series of rotary cutters, of a cutter-bar having a corresponding series of shearing plates, for cooperation with said rotary cutters, substantially as described.

5. In a machine of the class described, a cutter-bar provided with projecting guards and a corresponding series of shearing plates adjustably and removably secured to said guards.

6. In a machine of the class described, the combination with the series of rotary cutters, of the fixed cutter-bar provided with projecting-guards, and the series of shearing plates, adjustably and removably secured to said guards, substantially as described.

7. In a machine of the class described, the combination with the cutter-bar provided with guards and shearing plates of a high speeded cutter-shaft, carrying a series of rotary cutters cooperating with said shearing plates, and one or more balance wheels on said cutter shaft, for steadying the motion and reducing the jars and sudden strains on the draft animal, substantially as described.

8. The combination with a main frame and driving wheels, of stub-shafts journaled in said frame, in line with each other driven from said driving wheels, and provided with couplings on their stub ends, for detachably holding and operating tool carrying shafts, substantially as described.

9. The combination with the main frame and driving wheels of the stub shafts having pinions in mesh with the gears on the driving wheels, and a clutch mechanism, connecting the said pinions with their supporting shafts, for permitting the shaft to turn independently of the pinion, at either end, substantially as described.

10. The combination with a pinion and a tool carrying shaft operated thereby, of the clutch mechanism connecting the said pinion and shaft, consisting of the loose pieces $k^3$ working in the notches $k^4$ on the interior of the pinion and engageable, in the driving action, with the notches $k^5$ on the exterior of the shaft, while permitting the shaft to turn independently of the pinion, substantially as described.

11. In a machine of the class described, the combination with a cutter bar, provided with projecting guards, of the corresponding series of shearing plates, seated in pairs on said guards, for independent adjustment thereon, substantially as described.

12. In a machine of the class described, the combination with a main frame and ground wheels, of a pair of stub shafts journaled in said frame in line with each other, and a pair of balance wheels located, one on each of said stub shafts, adapted for the application of roller lagging, and means for adjusting the frame on the axle of the wheels, for throwing the balance wheels with the roller lagging in contact with the ground, substantially as described, whereby the said machine may be utilized as a roller.

13. In a machine of the class described, the combination with a pair of driving or ground wheels and a common axle connecting the same, of a main frame consisting of two independent side castings secured to the said axle and spaced apart from each other thereon, provided with depending bracket-like portions, a removable cutter-bar or cross brace, connecting said depending portion of said casting, and a cross-tie connecting the said castings, at their forward end, whereby the said axle, side castings, and cross-braces will constitute a rigid frame-work, for supporting the operative parts of the machine, substantially as described.

In testimony whereof we affix our signatures in presence of two witnesses.

WILLIAM ALLINGHAM.
    JAMES ALLINGHAM.

Witnesses as to signature of William Allingham:
  N. C. SCOTT,
  ETHEL M. ALLINGHAM.

Witnesses as to signature of James Allingham:
  HENRY J. ALLINGHAM,
  OBIE ALLINGHAM.